United States Patent
Mohinder et al.

(10) Patent No.: US 10,929,540 B2
(45) Date of Patent: Feb. 23, 2021

(54) TRUSTED UPDATES

(71) Applicant: McAfee, Inc., San Jose, CA (US)

(72) Inventors: Preet Mohinder, New Delhi (IN); Ratnesh Pandey, Uttar Pradesh (IN); Jaskaran Singh Khurana, New Delhi (IN); Amritanshu Johri, Haryana (IN)

(73) Assignee: McAfee, LLC, San Jose, CA (US)

( * ) Notice: Subject to any disclaimer, the term of this patent is extended or adjusted under 35 U.S.C. 154(b) by 0 days.

(21) Appl. No.: 16/565,643

(22) Filed: Sep. 10, 2019

(65) Prior Publication Data
US 2020/0004966 A1 Jan. 2, 2020

Related U.S. Application Data

(63) Continuation of application No. 15/535,552, filed as application No. PCT/US2015/065143 on Dec. 11, 2015, now Pat. No. 10,409,989.

(30) Foreign Application Priority Data

Dec. 26, 2014 (IN) .......................... 6600/CHE/2014

(51) Int. Cl.
 *G06F 21/57* (2013.01)
 *G06F 8/65* (2018.01)
(52) U.S. Cl.
 CPC ............... *G06F 21/57* (2013.01); *G06F 8/65* (2013.01); *G06F 2221/2141* (2013.01)
(58) Field of Classification Search
 CPC ..... G06F 21/57; G06F 8/65; G06F 2221/2141
 See application file for complete search history.

(56) References Cited

U.S. PATENT DOCUMENTS

| 5,987,610 A | 11/1999 | Franczek et al. |
| 6,073,142 A | 6/2000 | Geiger et al. |
| 6,460,050 B1 | 10/2002 | Pace et al. |

(Continued)

FOREIGN PATENT DOCUMENTS

| CN | 102047709 A | 5/2011 |
| CN | 102112990 B | 8/2014 |

(Continued)

OTHER PUBLICATIONS

European Extended Search Report in European Patent Application No. 15874121.5 dated Jun. 13, 2018, 6 pages.

(Continued)

*Primary Examiner* — Matthew Smithers
(74) *Attorney, Agent, or Firm* — Patent Capital Group

(57) ABSTRACT

There is disclosed in one example a computing apparatus, including: a hardware platform including a processor and a memory; a whitelist; an updater, the updater being an executable object authorized to modify files within the whitelist and to launch one or more child processes; and instructions encoded within the memory to provide a system management agent to: maintain a chain of trust between the one or more child processes and the updater, wherein the one or more child processes inherit whitelist permissions associated with the updater; and track the chain of trust across a system reboot, including granting a child process the chain of trust after a reboot only if the child process has associated with it a valid certificate.

20 Claims, 11 Drawing Sheets

(56) References Cited

U.S. PATENT DOCUMENTS

| | | | |
|---|---|---|---|
| 7,506,155 B1 | 3/2009 | Stewart et al. | |
| 8,844,024 B1* | 9/2014 | Graf | G06F 21/44 |
| | | | 726/19 |
| 8,910,283 B1 | 12/2014 | Gusarov et al. | |
| 8,950,007 B1 | 2/2015 | Teal et al. | |
| 10,409,989 B2* | 9/2019 | Mohinder | G06F 21/57 |
| 2005/0138386 A1 | 6/2005 | Saint | |
| 2006/0248585 A1 | 11/2006 | Ward et al. | |
| 2007/0033652 A1 | 2/2007 | Sherwani et al. | |
| 2007/0179907 A1* | 8/2007 | Waris | G06F 21/575 |
| | | | 705/76 |
| 2007/0256072 A1 | 11/2007 | Barr et al. | |
| 2008/0256363 A1* | 10/2008 | Balacheff | G06F 21/572 |
| | | | 713/187 |
| 2011/0047537 A1 | 2/2011 | Yu et al. | |
| 2013/0185799 A1* | 7/2013 | Pfeifer | G06F 21/57 |
| | | | 726/24 |
| 2013/0247024 A1 | 9/2013 | Sallam | |
| 2013/0339944 A1 | 12/2013 | Frank et al. | |
| 2015/0222637 A1 | 8/2015 | Hung et al. | |
| 2016/0203313 A1 | 7/2016 | El-Moussa et al. | |
| 2017/0351862 A1 | 12/2017 | Mohinder | |
| 2018/0103097 A1 | 4/2018 | Shell et al. | |

FOREIGN PATENT DOCUMENTS

| | | |
|---|---|---|
| WO | 2014145039 A1 | 9/2014 |
| WO | 2016105969 A1 | 6/2016 |

OTHER PUBLICATIONS

International Preliminary Report on Patentability in International Application No. PCT/US2015/065143 dated Jun. 27, 2017, 8 pages.
International Search Report and Written Opinion in International Application No. PCT/US2015/065143 dated Mar. 30, 2016, 9 pages.
Non Final Office Action in U.S. Appl. No. 15/535,552 dated Dec. 28, 2018, 10 pages.
Notice of Allowance in U.S. Appl. No. 15/535,552 dated May 15, 2019, 9 pages.

* cited by examiner

TRUSTED UPDATES

CROSS REFERENCE TO RELATED APPLICATION

This application is a continuation of U.S. patent application Ser. No. 15/535,552, filed on Jun. 13, 2017 and entitled "TRUSTED UPDATES" which application is a national stage application under 35 U.S.C. § 371 of PCT International Application Serial No. PCT/US2015/065143, filed on Dec. 11, 2015 and entitled "TRUSTED UPDATES" which application claims the benefit of and priority to Indian Non-Provisional Patent Application No. 6600/CHE/2014 filed 26 Dec. 2014 entitled "TRUSTED UPDATES". The disclosures of the prior applications are considered part of and are hereby incorporated by reference in their entirety in the disclosure of this application.

FIELD OF THE DISCLOSURE

This application relates to the field of computer security, and more particularly to a system and method for providing trusted updates.

BACKGROUND

As used throughout this specification, a "whitelist" includes any sanitized list of computing objects that are authorized to run on a computing device, and that may be modified only by an executable object designated as an updater. An "updater" is thus an executable object that is authorized to modify a group of whitelisted files on the computing device. For example, an updater may be a system update service running on a Microsoft Windows system that is configured to download and install patches and updates for installed software. In another example, an updater may be an update daemon running on a Linux or Unix system, including update daemons provided with common software repositories, such as "ports" and its variants, which may manage a large number of installed packages, including security and feature updates. Updaters may also include individual update agents provided by specific software packages. For example, the Java Runtime Engine (JRE) provided by Oracle Corporation commonly installs a Java update agent that periodically checks for new Java updates.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

DETAILED DESCRIPTION OF THE EMBODIMENTS

Summary

Figure 1:
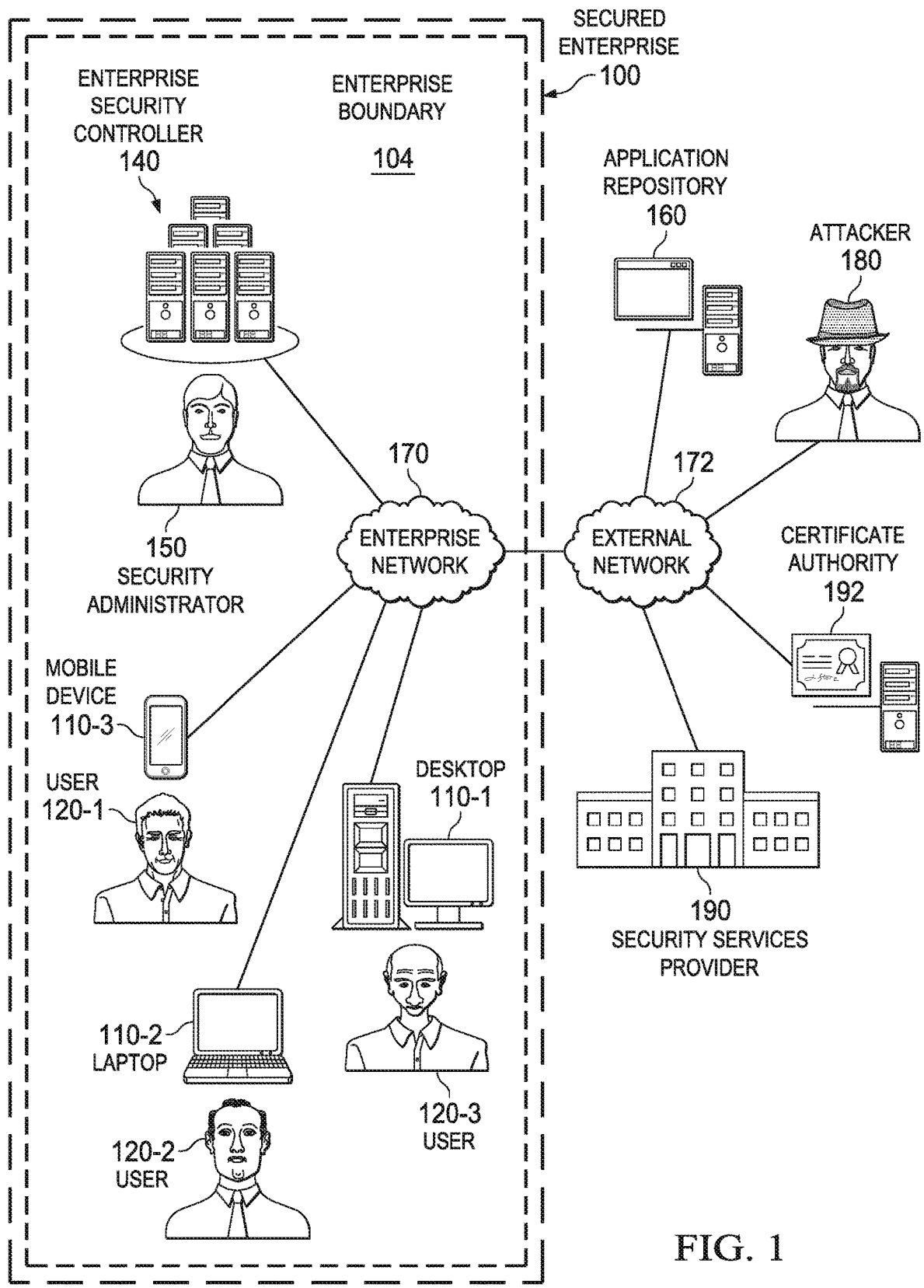
FIG. 1 is a block diagram of a security-enabled network according to one or more examples of the present specification.

In an example, there is disclosed a computing apparatus, comprising: a hardware platform comprising a processor and a memory; a whitelist; an updater, the updater being an executable object authorized to modify files within the whitelist and to launch one or more child processes; and instructions encoded within the memory to provide a system management agent to: maintain a chain of trust between the one or more child processes and the updater, wherein the one or more child processes inherit whitelist permissions associated with the updater; and track the chain of trust across a system reboot, comprising granting a child process the chain of trust after a reboot only if the child process has associated with it a valid certificate.

Example Embodiments of the Disclosure

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed.

Different embodiments many have different advantages, and no particular advantage is necessarily required of any embodiment.

A "system management agent" is a security measure often used in enterprise computing environments, or other environments where security or consistencies are at a premium. The system management agent may run as a background process or a kernel module or both, with elevated system privileges, monitoring the system for attempts to install unauthorized software or modify files without authorization, and otherwise enforce enterprise computing policies. However, to facilitate updates of installed, authorized programs, a system-wide whitelist may be provided, and the security administrator for the enterprise may designate a certain class or group of executable objects as "trusted updaters."

In an example, properties of updaters include the following:

a. A process running as an updater should have the ability to modify any file in the whitelist. This can include, updating, modifying, deleting, or otherwise altering any file in the whitelist.
b. An updater process may also be allowed to execute any binary object, even if that binary object is not present in the whitelist.
c. The updater architecture should provide for updater inheritance. This means that any binary object or process launched by the updater inherits the privileges of the updater, including the ability to modify files on the whitelist. Thus, any binary object launched by the updater should be able to do anything that the updater would be able to do by itself. In updater inheritance, any child process of an updater binary object will run with updater privileges.

One feature of a trusted updater is that it may include a "trusted file set." The trusted file set is a subset of the files in the global whitelist that belong to the same workflow as the trusted updater. The trusted updater is authorized to modify, which in this context can include any or all of creating a file, deleting a file, renaming a file, changing a file's metadata such as permissions and attributes, or otherwise operating on a file, any file in its trusted file set. The trusted updater may also be authorized to launch child processes or to execute other binaries, in which case a chain of trust may be established. In an example, a trusted updater may be authorized to launch any process, but each process may only modify files appearing in the whitelist that are part of trusted file set. In other words, an executable object or a process is permitted to modify a file only if it can trace its chain of trust back to a trusted updater that is authorized to modify the file.

For example, trusted updater "A" may have a trusted file set selected from the whitelist. Process A may launch process "B," which in its turn may launch process "C." In this case, B and C may be standard system utilities, and it may not be practical or reasonable to individually whitelist every utility program that process A may need. It may also not be desirable to treat B and C themselves as trusted updaters alone, since this could lead to unauthorized modifications. However, because in this case B and C have a chain of trust that traces back to trusted updater A, they are permitted to modify files in process A's trusted file set. This configuration enables trusted updaters to keep authorized programs up-to-date and to operate auxiliary programs without needing special dispensation for each update from an enterprise security manager.

However, a common requirement for updates, particularly in Microsoft Windows systems, is that the machine must be rebooted before the update can be completed. This may be necessary, for example, for the updater to update files, processes, or services that are resident in memory at the time of installation.

Rebooting, however, may break the chain of trust. For example, process "A" (an updater) may launch process "B," which may write certain instructions to a startup script so that process "C" is launched at the next reboot. It is intended for process C to modify files contained in the trusted file set for updater A. However, when the system reboots, the chain of trust from process A is broken. Thus, the system management agent may block process C from updating the files that it needs to update, even though they appear on the trusted file set for process A. To work around this issue and permit the update to complete successfully, an enterprise security administrator may need to grant special dispensation. This may be tedious, but preferable to the alternative of having out-of-date software running on the system.

In another example, the system management agent may attempt to "remember" across the reboot that process C is a child process of process A, and therefore should be granted the same chain of trust. However, this defeats one of the security features of the system management agent. Specifically, the system management agent cannot now verify that process C is being launched as a legitimate child of A. Thus, it is beneficial to provide a method for system management agent that can robustly identify process C as belonging to a chain of trust originating with process A, even across a reboot, with minimal or no manual intervention from the security administrator.

In one example, the present specification describes a verification scheme that can be implemented by using a validation object, such as a public key infrastructure (PKI) certificate, assigned to the trusted updater. In this example, an executable object is marked as a trusted updater only if it has a valid certificate signed by a trusted certificate authority, in addition to meeting other enterprise-specific requirements for being a trusted updater. As used throughout this specification, a "certificate" includes any digital token, file, string, validation object, or other object assigned to an updater or installer that verifies the updater or installer's heritage and/or integrity to a degree of confidence acceptable for the use case. In an example, a checksum of the binary is digitally signed by the certificate and embedded in the executable object, so that tampering with the executable object can be readily detected by performing a checksum on the object and determining whether it matches the checksum embedded in the binary.

In some cases, a certificate may include verification tokens for a plurality of executable objects that are controlled by the parent trusted updater. Thus, in the example where trusted updater process A launches process B, which in turn launches process C, the certificate for process A may include verification tokens for process B and for process C as well. In one example, the certificate may also include a verification token for a different process D, which should not be executed on the system. For example, trusted updater A may be an installer for a web browser program, which also can install program D, which is a chat component of the web browser. In this example, the web browser may be authorized by enterprise security policies, but the chat program may not. Thus, a properly functioning client device will install A (including allowing process A and any child process to modify files in process A's whitelist), but will block process D from modifying files on the whitelist, even though it has a valid certificate.

Thus, in one example, a trust grid may be maintained to cross reference trusted updaters against whitelisted files and valid certificates. In this example, process A is a trusted updater, and processes B and C appear in its trusted file set. Processes B and C also are validated by the same certificate that validates process A. Process D is also validated by the certificate, but does not appear in the trusted file set for process A. Thus, if a user or process attempts to launch process D, the security manager and agent may look up process D in its security grid, and determine that although process D has a valid certificate, it does not appear in the trusted file set for process A, and thus should be blocked from executing.

This procedure enables a security administrator to use existing verification infrastructure, such as PKI certificates provided by commercial vendors to provide fine granularity tuning of authorization for that commercial software. Certain portions of the software may be allowed to install, while other portions of the software may be blocked by policy.

The embodiments of FIGS. 4, 5A, 5B, and 6 below disclose an example of a "trust tree" architecture, which in certain embodiments may result in broken inheritance. Issues with breaking inheritance as described herein may be solved in one more embodiments by providing a system and method for providing "trusted installers" and "trusted services" in addition to the "trusted updaters" described above. In one example, a trusted installer inherits the properties of a trusted updater, and also includes the following capabilities:

a. When files are added to the whitelist, the system management agent keeps track of all files created or imported by the same trusted installer and having a common certificate. These files constitute a "chain of trust."

b. Files in the chain of trust are permitted to modify each other. To keep track of files in a chain of trust, each may be tagged with an identifier, such as a globally unique identifier (GUID).

c. A trusted installer may be an application installer, or may be provided by a third-party software management product.

Thus, in principle, a trusted installer may automatically discover additional updaters during the installation process, which enables seamless installation and post-installation activities during the lifecycle of an application.

In one example, a trusted installer marks installers, including third-party software management tools, as trusted for the system. The trusted installer then establishes a trust chain based on how a file is brought into the system, as well as based on its associated certificates. Only files belonging to the same trust chain can modify each other, and the root of the trust chain must be a trusted installer.

In one example, a trusted installer is able to trigger the creation of a trust chain during installation. Any third-party installer can be marked as a trusted installer, thus allowing the third-party installer to install all application files without identifying updater rules for individual applications and installers. The trust chain does not require any additional rules for updaters, including additional rules that would be needed to work around broken updater inheritance chains. In another example, self-updates of an application installed via a trusted installer will not require manual configuration of updater rules.

There is also provided herein a mechanism for "trusted services". A trusted service may be, for example, a service running under Windows hosted services as an updater or trusted updater. The operative principle of a trusted updater or a trusted service is the principle of least privilege, and improves the usability by providing a simplified interface for a user to configure services to run as an updater inside of a secure container. The trusted service also identifies the actual service behavior seamlessly without diving deeply into what service does.

In one example, using a trust chain is more robust than relying on a process tree, as described above, to determine updater privilege. The trust chain also plugs security holes that may arise for hosted services if they are marked as an updater. A hosted service marked as an updater, in a shared container, will result in other hosted services also running in the shared container and having the same privileges. Any process launched by any of them will also inherit those privileges. But a hosted service marked as a trusted service will be launched in its own container where its privileges can be inherited by child processes in a safe manner.

A trusted service according to the present specification provides enhanced security as described herein. For example, hosted services may not be marked as updaters in shared mode. Trusted services also provide clean isolation of updaters from services that might be vulnerable. Thus, a trusted service avoids attacks via an exposed interface that might be provided for some other shared hosted service. The system and method of the present specification also fix existing running hosted services that were launched as an update in shared mode by relaunching the services in its own process and in context of the service. There may also be provided persistence of configuration across service registration and service reconfiguration. Overall, the system and method of the present specification may improve on security by ensuring the integrity of a whitelist is not compromised.

Trusted services may also improve on usability. For example they may improve on ease of configuration and management of updater rules based on service name. They also automatically mark services as an updater for new rules that are added without an explicit reboot. Finally, trusted services may provide improved auditing for compliance and report generation.

FIG. 1 is a network-level diagram of a secured enterprise 100 according to one or more examples of the present specification. In the example of FIG. 1, a plurality of users 120 operate a plurality of client devices 110. Specifically, user 120-1 operates desktop computer 110-1. User 120-2 operates laptop computer 110-2. And user 120-3 operates mobile device 110-3.

Each computing device may include an appropriate operating system, such as Microsoft Windows, Linux, Android, Mac OSX, Apple iOS, Unix, or similar. Some of the foregoing may be more often used on one type of device than another. For example, desktop computer 110-1, which in one embodiment may be an engineering workstation, may be more likely to use one of Microsoft Windows, Linux, Unix, or Mac OSX. Laptop computer 110-2, which is usually a portable off-the-shelf device with fewer customization options, may be more likely to run Microsoft Windows or Mac OSX. Mobile device 110-3 may be more likely to run Android or iOS. However, these examples are not intended to be limiting.

In one example, some or all of client devices 110 may include a system management agent that prevents installation of unauthorized software.

Client devices 110 may be communicatively coupled to one another and to other network resources via enterprise network 170. Enterprise network 170 may be any suitable network or combination of one or more networks operating on one or more suitable networking protocols, including for example, a local area network, an intranet, a virtual network, a wide area network, a wireless network, a cellular network, or the internet (optionally accessed via a proxy, virtual machine, or other similar security mechanism) by way of non-limiting example. Enterprise network 170 may also include one or more servers, firewalls, routers, switches, security appliances, antivirus servers, or other useful network devices. In this illustration, enterprise network 170 is shown as a single network for simplicity, but in some embodiments, enterprise network 170 may include a large number of networks, such as one or more enterprise intranets connected to the internet. Enterprise network 170 may also provide access to an external network, such as the internet, via external network 172. External network 172 may similarly be any suitable type of network.

One or more computing devices configured as an enterprise security controller (ESC) 140 may also operate on enterprise network 170. ESC 140 may provide a user interface for a security administrator 150 to define enterprise security policies, which ESC 140 may enforce on enterprise network 170 and across client devices 120.

Secured enterprise 100 may encounter a variety of "security objects" on the network. A security object may be any object that operates on or interacts with enterprise network 170 and that has actual or potential security implications. In one example, object may be broadly divided into hardware objects, including any physical device that communicates with or operates via the network, and software objects. Software objects may be further subdivided as "executable objects" and "static objects." Executable objects include any object that can actively execute code or operate autonomously, such as applications, drivers, programs, executables, libraries, processes, runtimes, scripts, macros, binaries, interpreters, interpreted language files, configuration files with inline code, embedded code, and firmware instructions by way of non-limiting example. A static object may be broadly designated as any object that is not an executable object or that cannot execute, such as documents, pictures, music files, text files, configuration files without inline code, videos, and drawings by way of non-limiting example. In some cases, hybrid software objects may also be provided, such as for example a word processing document with built-in macros or an animation with inline code. For security purposes, these may be considered as a separate class of software object, or may simply be treated as executable objects.

Enterprise security policies may include authentication policies, network usage policies, network resource quotas, antivirus policies, and restrictions on executable objects on client devices 110 by way of non-limiting example. System management agents may help to enforce these policies, including restricting unauthorized executable objects from modifying certain files. Various network servers may provide substantive services such as routing, networking, enterprise data services, and enterprise applications.

Secure enterprise 100 may communicate across enterprise boundary 104 with external network 172. Enterprise boundary 104 may represent a physical, logical, or other boundary. External network 172 may include, for example, websites, servers, network protocols, and other network-based services. In one example, an application repository 160 is available via external network 172, and an attacker 180 (or other similar malicious or negligent actor) also connects to external network 172.

It may be a goal of users 120 and secure enterprise 100 to successfully operate client devices 110 without interference from attacker 180 or from unwanted security objects. In one example, attacker 180 is a malware author whose goal or purpose is to cause malicious harm or mischief. The malicious harm or mischief may take the form of installing root kits or other malware on client devices 110 to tamper with the system, installing spyware or adware to collect personal and commercial data, defacing websites, operating a botnet such as a spam server, or simply to annoy and harass users 120. Thus, one aim of attacker 180 may be to install his malware on one or more client devices 110. As used throughout this specification, malicious software ("malware") includes any security object configured to provide unwanted results or do unwanted work. In many cases, malware objects will be executable objects, including by way of non-limiting examples, viruses, trojans, zombies, rootkits, backdoors, worms, spyware, adware, ransomware, dialers, payloads, malicious browser helper objects, tracking cookies, loggers, or similar objects designed to take a potentially-unwanted action, including by way of non-limiting example data destruction, covert data collection, browser hijacking, network proxy or redirection, covert tracking, data logging, keylogging, excessive or deliberate barriers to removal, contact harvesting, and unauthorized self-propagation.

Attacker 180 may also want to commit industrial or other espionage against secured enterprise 100, such as stealing classified or proprietary data, stealing identities, or gaining unauthorized access to enterprise resources. Thus, attacker 180's strategy may also include trying to gain physical access to one or more client devices 110 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a client device 110. Buffer overruns may be the result, for example, of poor input validation or use of insecure libraries, and in many cases arise in nonobvious contexts. Thus, although not malicious himself, a developer contributing software to application repository 160 may inadvertently provide attack vectors for attacker 180. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new.

Certificate authority 192 may provide digital certificates, such as PKI certificates, which may be used to validate binary objects, including secure updaters. A trust relationship may be established between secured enterprise 100 and certificate authority 192, so that secured enterprise 100 can Dean a binary object as valid and safe if that object has an associated certificate issued by certificate authority 192. In this example, certificate authority 192 is shown as an external entity, but it is also reasonable that certificate authority 192 could be an internal certificate authority to secured enterprise 100. Furthermore, security services provider 190 can also issue certificates and act as certificate authority 192. Other configurations are possible.

In some cases, certificate authority 192 may issue certificates to applications that may be downloaded from application repository 160. Thus, an enterprise security policy may allow an application to be installed from application repository 160 only if it has a valid certificate issued by certificate authority 192, and is provided in an authorized list of applications for secured enterprise 100. In this case, an installer program for the authorized application may be marked as an updater or trusted updater according to the system and method disclosed herein. In one example, security administrator 150 may run in installation of the application from application repository 160 on a sandbox environment in enterprise security controller 140. Security administrator 150 may use this process to build a list of files required for installing the application. This list may then be distributed as a trusted file set for the secure updater associated with the application.

Application repository 160 may represent a Windows or Apple "app store" or update service, a Unix-like repository or ports collection, or other network service providing users 120 the ability to interactively or automatically download and install applications on client devices 110. If application repository 160 has security measures in place that make it difficult for attacker 190 to distribute overtly malicious software, attacker 190 may instead stealthily insert vulnerabilities into apparently-beneficial applications.

In some cases, secured enterprise 100 may provide policy directives that restrict the types of applications that can be installed from application repository 160. Thus, application repository 160 may include software that is not negligently developed and is not malware, but that is nevertheless against policy. For example, some enterprises restrict installation of entertainment software like media players and games. Thus, even a secure media player or game may be unsuitable for an enterprise computer. Security administrator 150 may be responsible for distributing a computing policy consistent with such restrictions and enforcing it on client devices 120.

Secured enterprise 100 may also contract with or subscribe to a security services provider 190, which may provide security services, updates, antivirus definitions, patches, products, and services. McAfee®, Inc. is a non-limiting example of such a security services provider that offers comprehensive security and antivirus solutions.

In another example, secured enterprise 100 may simply be a family, with parents assuming the role of security administrator 150. The parents may wish to protect their children from undesirable content, such as pornography, adware, spyware, age-inappropriate content, advocacy for certain political, religious, or social movements, or forums for discussing illegal or dangerous activities, by way of non-limiting example. In this case, the parent may perform some or all of the duties of security administrator 150.

Collectively, any object that is or can be designated as belonging to any of the foregoing classes of undesirable objects may be classified as a malicious object. When an unknown object is encountered within secured enterprise 100, it may be initially classified as a "candidate malicious object." This designation may be to ensure that it is not granted full network privileges until the object is further analyzed. Thus, it is a goal of users 120 and security administrator 150 to configure and operate client devices 110 and enterprise network 170 so as to exclude all malicious objects, and to promptly and accurately classify candidate malicious objects. A system management agent may be used to ensure that malicious objects are never executed, and that candidate malicious objects cannot be executed until they have been properly characterized. To enforce this policy, the system management agent may be configured to prevent any executable object from modifying system files if it is not a trusted updater or trusted installer.

Figure 2:
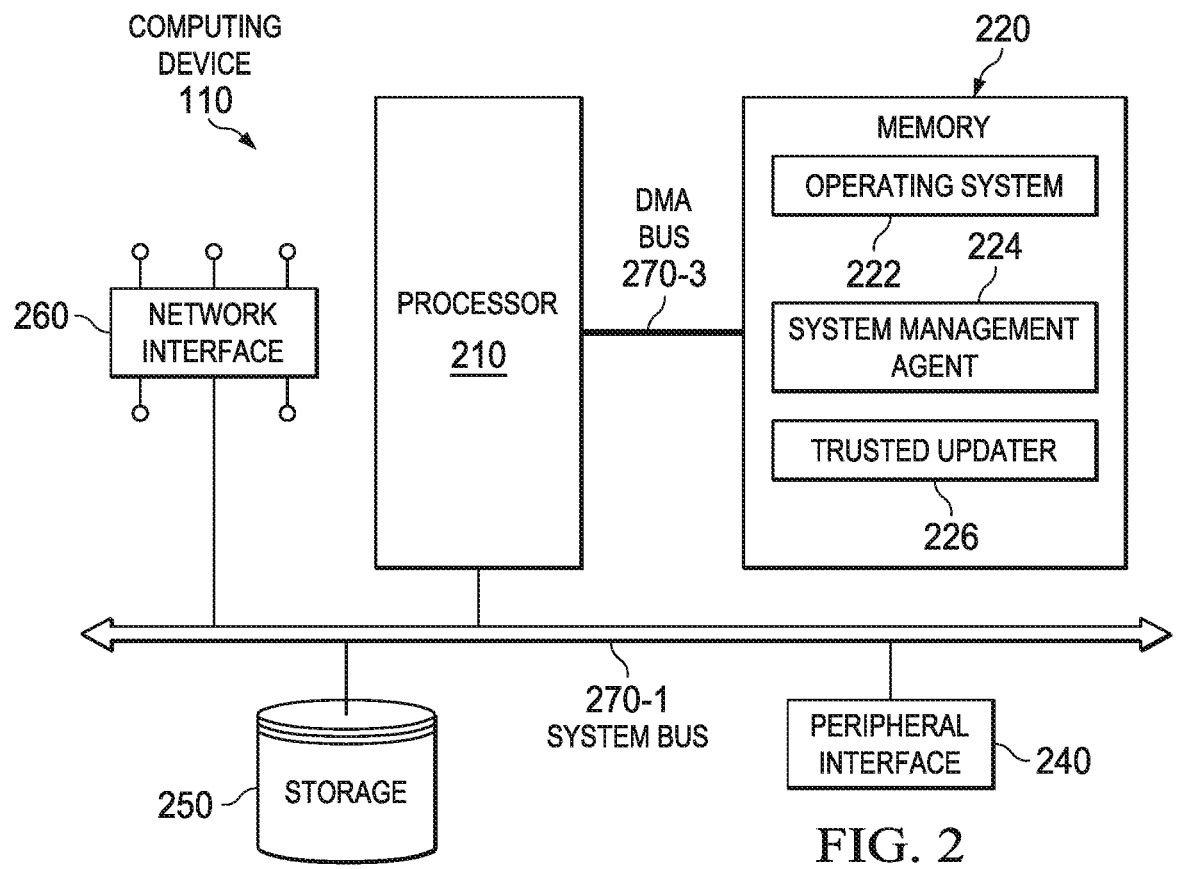
FIG. 2 is a block diagram of a computing device according to one or more examples of the present specification.

FIG. 2 is a block diagram of client device 110 according to one or more examples of the present specification. Client device 110 may be any suitable computing device. In various embodiments, a "computing device" may be or comprise, by way of non-limiting example, a computer, workstation, embedded computer, embedded controller, embedded sensor, personal digital assistant, laptop computer, cellular telephone, IP telephone, smart phone, tablet computer, convertible tablet computer, computing appliance, network appliance, receiver, wearable computer, handheld calculator, or any other electronic, microelectronic, or microelectromechanical device for processing and communicating data Client device 110 includes a processor 210 connected to a memory 220, having stored therein executable instructions for providing an operating system 222 and at least software portions of a system management agent 224. Other components of client device 110 include a storage 250, network interface 260, and peripheral interface 240. This architecture is provided by way of example only, and is intended to be non-exclusive and non-limiting. Furthermore, the various parts disclosed are intended to be logical divisions only, and need not necessarily represent physically separate hardware and/or software components. Certain computing devices provide main memory 220 and storage 250, for example, in a single physical memory device, and in other cases, memory 220 and/or storage 250 are functionally distributed across many physical devices. In the case of virtual machines or hypervisors, all or part of a function may be provided in the form of software or firmware running over a virtualization layer to provide the disclosed logical function. In other examples, a device such as a network interface 260 may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, microcode, programmable logic, or objects that can coordinate to achieve a logical operation.

In an example, processor 210 is communicatively coupled to memory 220 via memory bus 270-3, which may be for example a direct memory access (DMA) bus by way of example, though other memory architectures are possible, including ones in which memory 220 communicates with processor 210 via system bus 270-1 or some other bus. Processor 210 may be communicatively coupled to other devices via a system bus 270-1. As used throughout this specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of non-limiting example only, and that some embodiments may omit one or more of the foregoing buses, while others may employ additional or different buses.

In various examples, a "processor" may include any combination of logic elements, including by way of non-limiting example a microprocessor, digital signal processor, field programmable gate array, graphics processing unit, programmable logic array, application specific integrated circuit, or virtual machine processor. In certain architectures, a multi-core processor may be provided, in which case processor 210 may be treated as only one core of a multi-core processor, or may be treated as the entire multi-core processor, as appropriate. In some embodiments, one or more co-processor may also be provided for specialized or support functions.

Processor 210 may be connected to memory 220 in a DMA configuration via DMA bus 270-3. To simplify this disclosure, memory 220 is disclosed as a single logical block, but in a physical embodiment may include one or more blocks of any suitable volatile or non-volatile memory technology or technologies, including for example DDR RAM, SRAM, DRAM, cache, L1 or L2 memory, on-chip memory, registers, flash, read only memory (ROM), optical media, virtual memory regions, magnetic or tape memory, or similar. In certain embodiments, memory 220 may comprise a relatively low-latency volatile main memory, while storage 250 may comprise a relatively higher-latency non-volatile memory. However, memory 220 and storage 250 need not be physically separate devices, and in some examples may represent simply a logical separation of function. It should also be noted that although DMA is disclosed by way of non-limiting example, DMA is not the only protocol consistent with this specification, and that other memory architectures are available.

Storage 250 may be any species of memory 220, or may be a separate device. Storage 250 may include one or more non-transitory computer-readable mediums, including by way of non-limiting example, a hard drive, solid-state drive, external storage, redundant array of independent disks (RAID), network-attached storage, optical storage, tape drive, backup system, cloud storage, or any combination of the foregoing. Storage 250 may be, or may include therein, a database or databases or data stored in other configurations, and may include a stored copy of operational software such as operating system 222 and software portions of system management agent 224. Many other configurations are also possible, and are intended to be encompassed within the broad scope of this specification.

Network interface 260 may be provided to communicatively couple client device 110 to a wired or wireless network. A "network," as used throughout this specification, may include any communicative platform operable to exchange data or information within or between computing devices, including by way of non-limiting example, an ad-hoc local network, an internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

System management agent 224 may be any suitable engine that provides system management client services. This may include enforcing security policies for secured enterprise 100. For example, system management agent 224 may restrict the installation of any application on to computing device 110 that is not specifically authorized by security administrator 150. System management agent 224 may also receive antivirus and anti-malware updates, and other security procedures from enterprise security controller 140.

Trusted updater 226 may be configured as an authorized application or installer. This may include, for example, a Windows update service, a an application updater, or a centralized application repository such as the Unix "ports" system that provides a large number of applications, some of which may be authorized and others of which may not be authorized. System management agent 224 may include a trusted file set for trusted updater 226 including files that trusted updater 226 is authorized to install. In this example, trusted updater 226 and is disclosed as a single trusted updater, but it should be noted that in various embodiments, a plurality of trusted updaters may be provided. In one example, trusted updater 226 may also be an engine, as described herein.

System management agent 224, in one example, is operable to carry out computer-implemented methods according to this specification. System management agent 224 may include one or more non-transitory computer-readable mediums having stored thereon executable instructions operable to instruct a processor to provide a security engine. As used throughout this specification, an "engine" includes any combination of one or more logic elements, of similar or dissimilar species, operable for and configured to perform one or more methods provided by the engine. Thus, system management agent 224 may comprise one or more logic elements configured to provide security engine methods as disclosed in this specification. In some cases, system management agent 224 may include a special integrated circuit designed to carry out a method or a part thereof, and may also include software instructions operable to instruct a processor to perform the method. In some cases, system management agent 224 may run as a "daemon" process. A "daemon" may include any program or series of executable instructions, whether implemented in hardware, software, firmware, or any combination thereof, that runs as a background process, a terminate-and-stay-resident program, a service, system extension, control panel, bootup procedure, BIOS subroutine, or any similar program that operates without direct user interaction. In certain embodiments, daemon processes may run with elevated privileges in a "driver space," or in ring 0, 1, or 2 in a protection ring architecture. It should also be noted that system management agent 224 may also include other hardware and software, including configuration files, registry entries, and interactive or user-mode software by way of non-limiting example.

In one example, system management agent 224 includes executable instructions stored on a non-transitory medium operable to perform a method according to this specification. At an appropriate time, such as upon booting client device 110 or upon a command from operating system 222 or a user 120, processor 210 may retrieve a copy of system management agent 224 (or software portions thereof) from storage 250 and load it into memory 220. Processor 210 may then iteratively execute the instructions of system management agent 224 to provide the desired method.

Peripheral interface 240 may be configured to interface with any auxiliary device that connects to client device 110 but that is not necessarily a part of the core architecture of client device 110. A peripheral may be operable to provide extended functionality to client device 110, and may or may not be wholly dependent on client device 110. In some cases, a peripheral may be a computing device in its own right. Peripherals may include input and output devices such as displays, terminals, printers, keyboards, mice, modems, network controllers, sensors, transducers, actuators, controllers, data acquisition buses, cameras, microphones, speakers, or external storage by way of non-limiting example.

Figure 3:
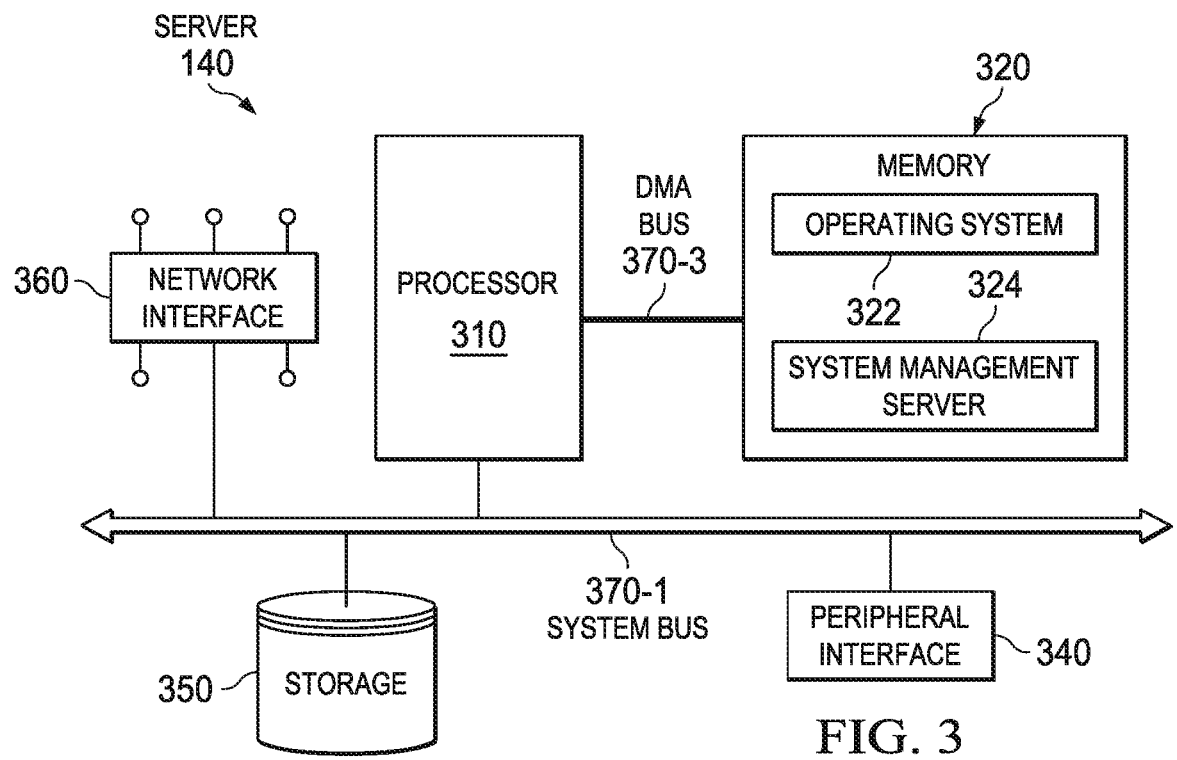
FIG. 3 is a block diagram of a server according to one or more examples of the present specification.

FIG. 3 is a block diagram of server 140 according to one or more examples of the present specification. Server 140 may be any suitable computing device, as described in connection with FIG. 2. In general, the definitions and examples of FIG. 2 may be considered as equally applicable to FIG. 3, unless specifically stated otherwise. Server 140 is described herein separately to illustrate that in certain embodiments, logical operations according to this specification may be divided along a client-server model, wherein client device 110 provides certain localized tasks, while server 140 provides certain other centralized tasks.

Server 140 includes a processor 310 connected to a memory 320, having stored therein executable instructions for providing an operating system 322 and at least software portions of a system management server 324. Other components of server 140 include a storage 350, network interface 360, and peripheral interface 340. As described in FIG. 2, each logical block may be provided by one or more similar or dissimilar logic elements.

In an example, processor 310 is communicatively coupled to memory 320 via memory bus 370-3, which may be for example a DMA bus. Processor 310 may be communicatively coupled to other devices via a system bus 370-1.

Processor 310 may be connected to memory 320 in a DMA configuration via DMA bus 370-3, or via any other suitable memory configuration. As discussed in FIG. 2, memory 320 may include one or more logic elements of any suitable type.

Storage 350 may be any species of memory 320, or may be a separate device, as described in connection with storage 250 of FIG. 2. Storage 350 may be, or may include therein, a database or databases or data stored in other configurations, and may include a stored copy of operational software such as operating system 322 and software portions of system management server 324.

Network interface 360 may be provided to communicatively couple server 140 to a wired or wireless network, and may include one or more logic elements as described in FIG. 2.

System management server 324 is a server engine that provides control configuration and control management for system management clients across secured enterprise 100. Specifically, each client device 110 may include a system management agent 224, which may be centrally managed and controlled by system management server 324.

System management server 324 is an engine as described in FIG. 2 and, in one example, includes one or more logic elements operable to carry out computer-implemented methods according to this specification. Software portions of system management server 324 may run as a daemon process.

System management server 324 may include one or more non-transitory computer-readable mediums having stored thereon executable instructions operable to instruct a processor to provide a security engine. At an appropriate time, such as upon booting server 140 or upon a command from operating system 222 or a user 120 or security administrator 150, processor 310 may retrieve a copy of system management server 324 (or software portions thereof) from storage 350 and load it into memory 320. Processor 310 may then iteratively execute the instructions of system management server 324 to provide the desired method.

Peripheral interface 340 may be configured to interface with any auxiliary device that connects to server 140 but that is not necessarily a part of the core architecture of server 140. A peripheral may be operable to provide extended functionality to server 140, and may or may not be wholly dependent on server 140. Peripherals may include, by way of non-limiting examples, any of the peripherals disclosed in FIG. 2.

Figure 4:
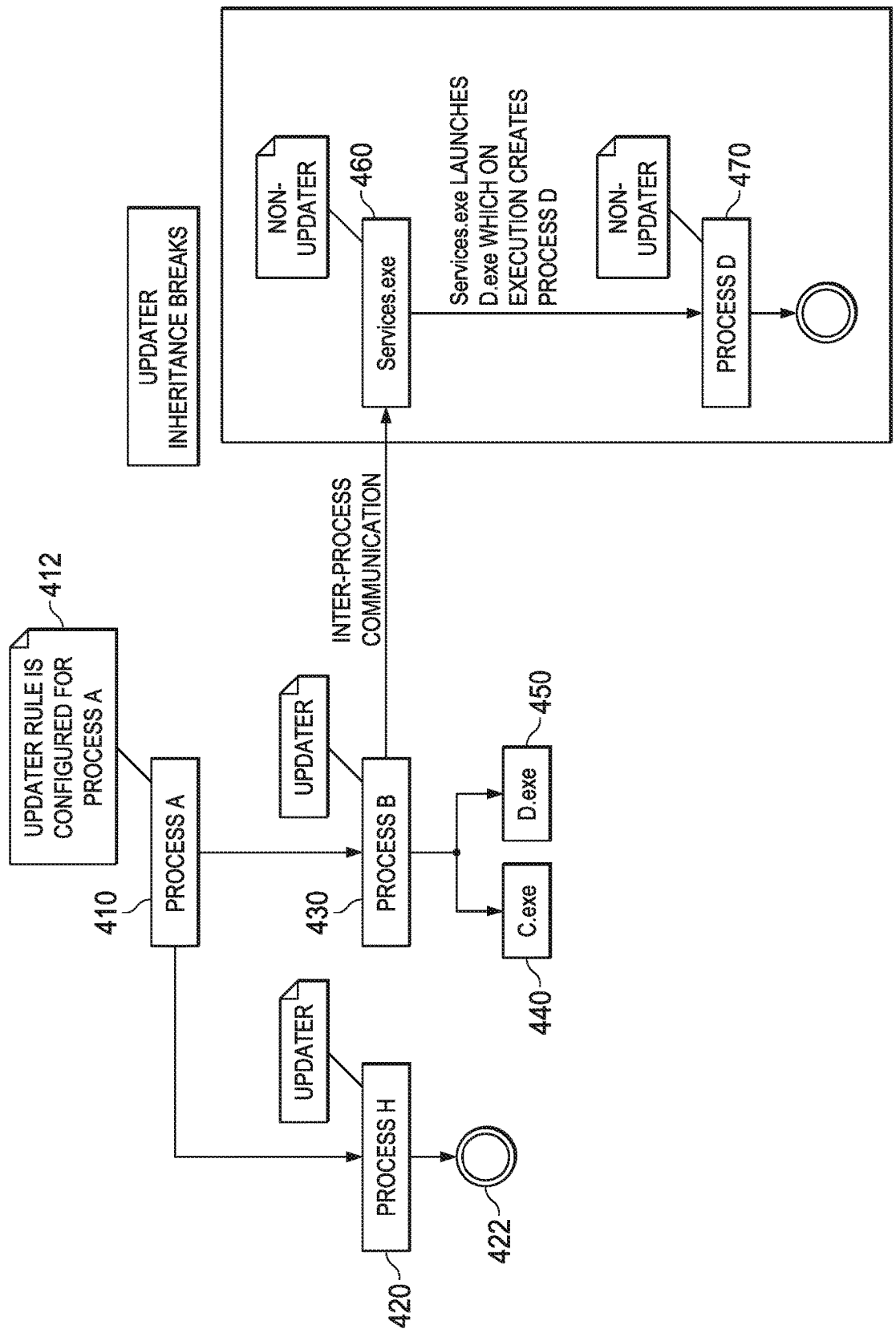
FIG. 4 is a functional block diagram of an update method according to one or more examples of the present specification.

FIG. 4 is a block diagram of an updater method according to one or more examples of the present specification. In the example of FIG. 4, an update may fail because inheritance breaks. In the examples herein, certain objects are treated as executable files with ".exe" filename extensions, a common convention in Microsoft Windows operating systems. However, the teachings are equally applicable to other operating systems that use other conventions, and should not be construed to be limiting. In a general sense, any of the binaries and processes disclosed herein may be, in practice, any suitable binary or process on an operating system, including an update agent or similar.

In this example, trusted updater A 410 has associated therewith updater rules 412, which may include a trusted file set that trusted updater A 410 is authorized to modify. In this example, updater rules 412 do not include permission for updater A to launch any specific executable objects. Rather, they include permission for updater A and child processes to modify certain static objects or executable objects on the system.

Trusted updater 410 launches two child processes, process H 420 and process B 430. "Processes" in this context may include threads started by the same process rather than a new executable object. Process H 420 is marked as an updater because it inherits the updater privileges of trusted updater 410. Process H performs its work, and in block 422 is done.

Trusted updater 410 also launches process B 430. Because process B 430 was launched by trusted updater 410, it inherits the updater privileges of trusted updater 410. Process B launches child binaries C.exe 440 and D.exe 450. Process B also engages in interprocess communication with services.exe 460. Services.exe 460 may be a binary object that launches child processes, such as the Windows "service host." Services.exe 460 is not an updater, and so does not inherit updater privileges from trusted updater 410. Services.exe launches D.exe 450, which executes and creates process D 470. In this case, process D 470 is not marked as an updater. This is because its parent is services.exe 460, which is a non-updater, rather than trusted updater 410, which is an updater. Thus, process D 470 does not get updater privileges, and therefore may be blocked from performing its work by system management agent 224. In block 480, process D fails to successfully perform its work, and the installation process may fail. The result will either be that an application that is desired and desirable does not get installed, or that the application fails to update, leaving the system potentially vulnerable to unpatched security exploits.

Figure 5A:
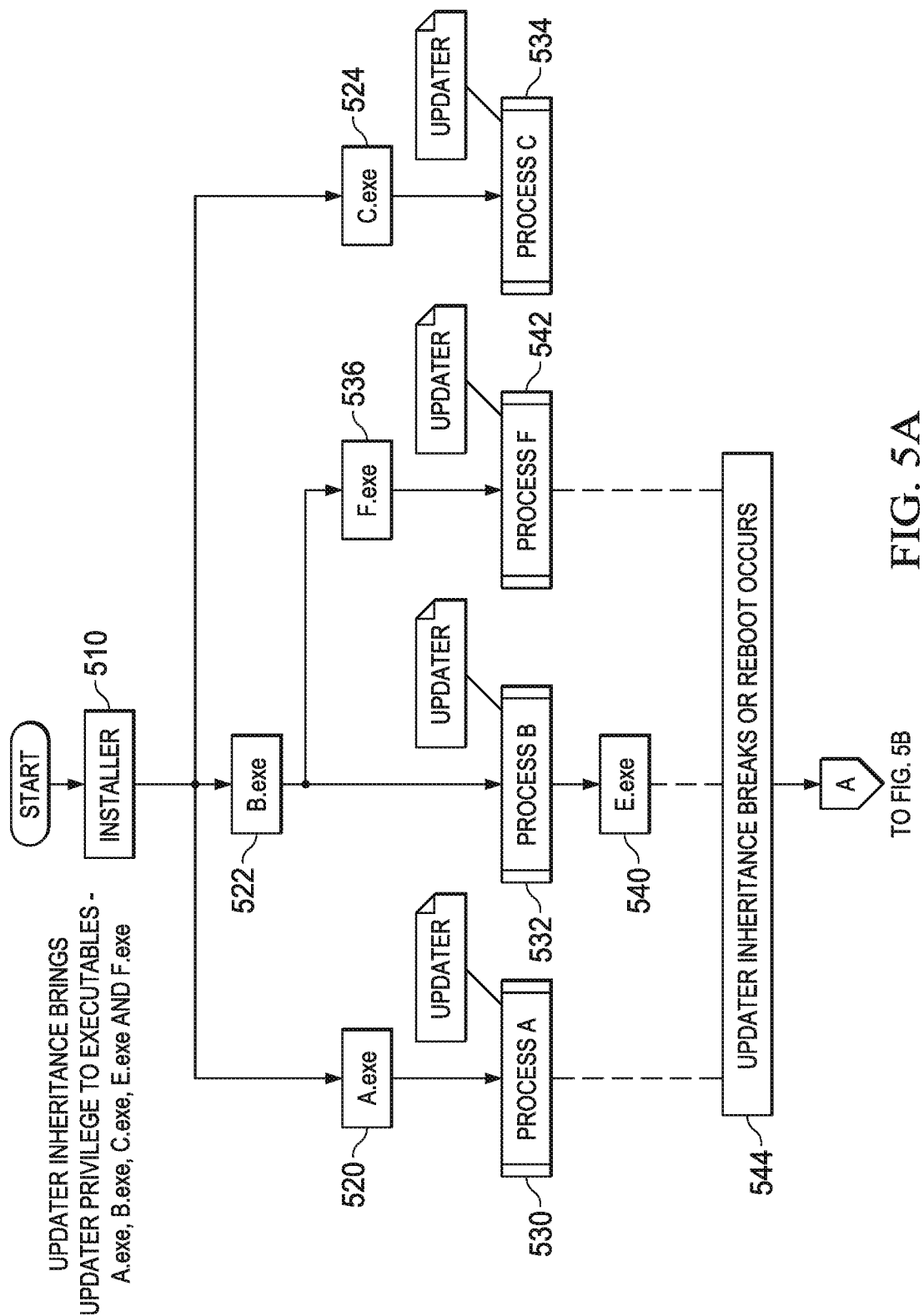
FIGS. 5A and 5B are a functional block diagram of an update method according to one or more examples of the present specification.
Figure 5B:
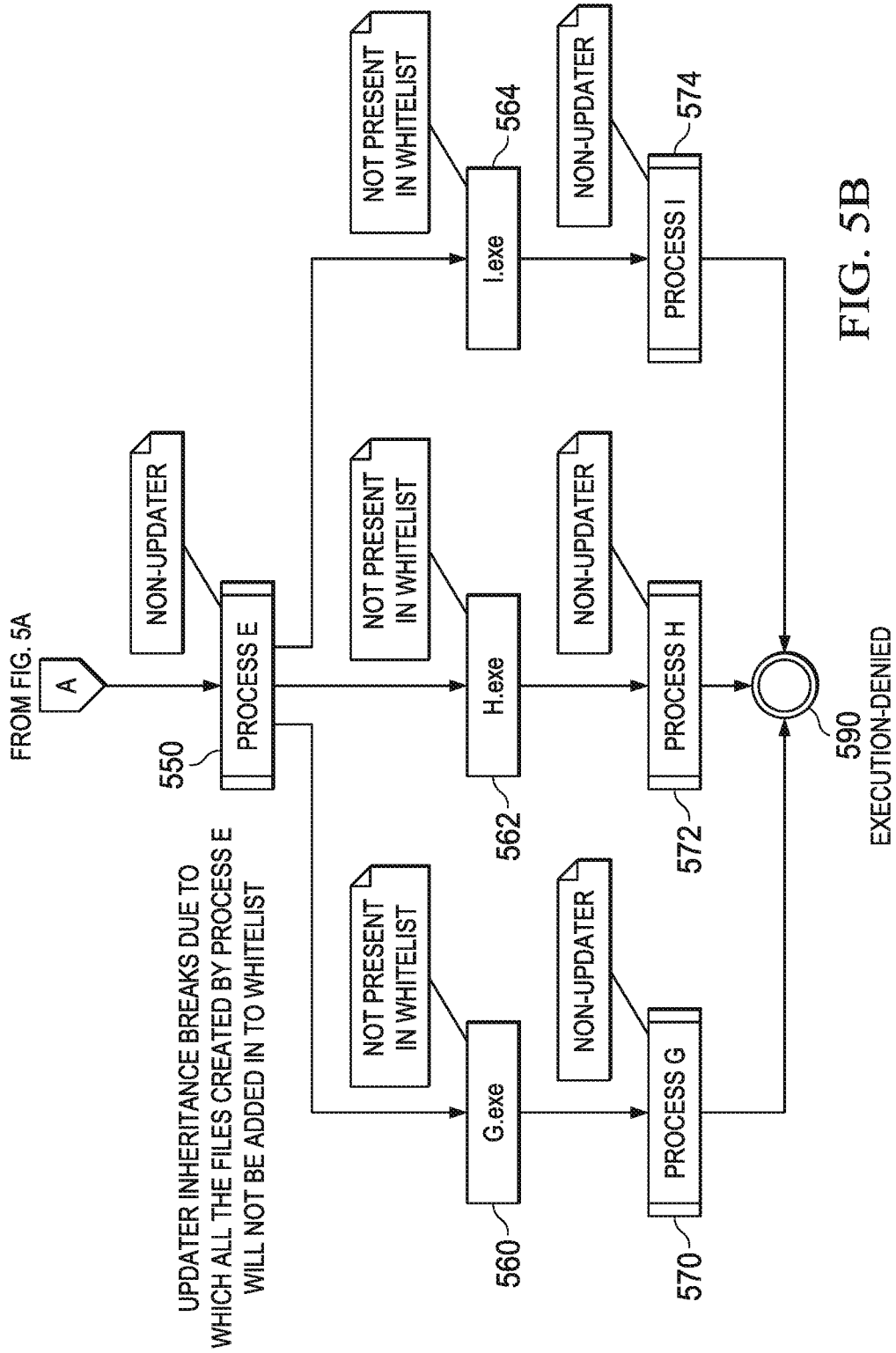

FIGS. 5A and 5B are a block diagram of a second updater process according to one or more examples of the present specification. FIG. 5A illustrates another way in which updater inheritance may break. Starting in block 510, installer 510 launches child binaries A.exe 520, D.exe 522, and C.exe 524. A.exe launches process A 530, which is treated as an updater because it can trace its chain of trust back to installer 510, which is a trusted updater. Thus, as long as a reboot does not occur, process a 530 may perform its desired work.

B.exe 522 is also marked as an updater because it can trace its chain of trust back to installer 510. B.exe launches process B 532 and F.exe 536. As before, process B 532 is marked as an updater because it can trace its chain of trust back to installer 510. Process B 532 launches E.exe 540. F.exe 536 launches process F 542, which is marked as an updater process because it can trace its chain of trust back to installer 510 via F.exe 536 and B.exe 522.

Finally, C.exe 524 launches process C 534 which is marked as an updater because it can trace its chain of trust back to C.exe 524 and installer 510, which is a trusted updater. Thus, process C 534 will be permitted to do its useful work.

Process A 530, E.exe 540, and process F 542 may require a reboot, or may be required to engage in interprocess communication. Thus, in block 544, a rebook occurs or updater inheritance otherwise breaks. This leads to off-page connector A.

In FIG. 5B, starting from off-page connector A, process E 550 is launched after a reboot by E.exe 540. E.exe 540 is no longer treated as an updater, because upon reboot, it can no longer trace its chain of trust back to installer 510. Rather, after the reboot, process E 550 launches as a new process with no chain of trust. Thus, process E 550 is not treated as an updater.

Process E 550 launches G.exe 560, H.exe 562, and I.exe 564. In this example, G.exe 560, H.exe 562, and I.exe 564 are not present in the trusted file set for installer 510, and process E 550 has no trusted file set because it is not treated as an updater. These 3 executables may be, for example, common system executables that should not be treated as installers in the normal case. Rather, the system utility should be trusted only one they are launched by an installer.

In this example, G.exe 560 launches process G 570, which is marked as a non-updater process. Process G 570 may attempt to alter a file in the trusted file set associated with installer 510. However, in block 590, execution is denied because process G 570 has not inherited updater privileges from trusted updater 510.

Similarly, H.exe 562 launches process H 572, which is marked as a non-updater. Thus, when process H 572 attempts to manipulate files in the trusted file set for trusted updater 510, in block 590, execution is denied.

Finally, I.exe 564 is not present in the whitelist, and launches process I 574. Process I 574 is also marked as a non-updater, and thus when process I 574 attempts to manipulate files in the whitelist for installer 510, execution is denied in block 590.

Figure 6:
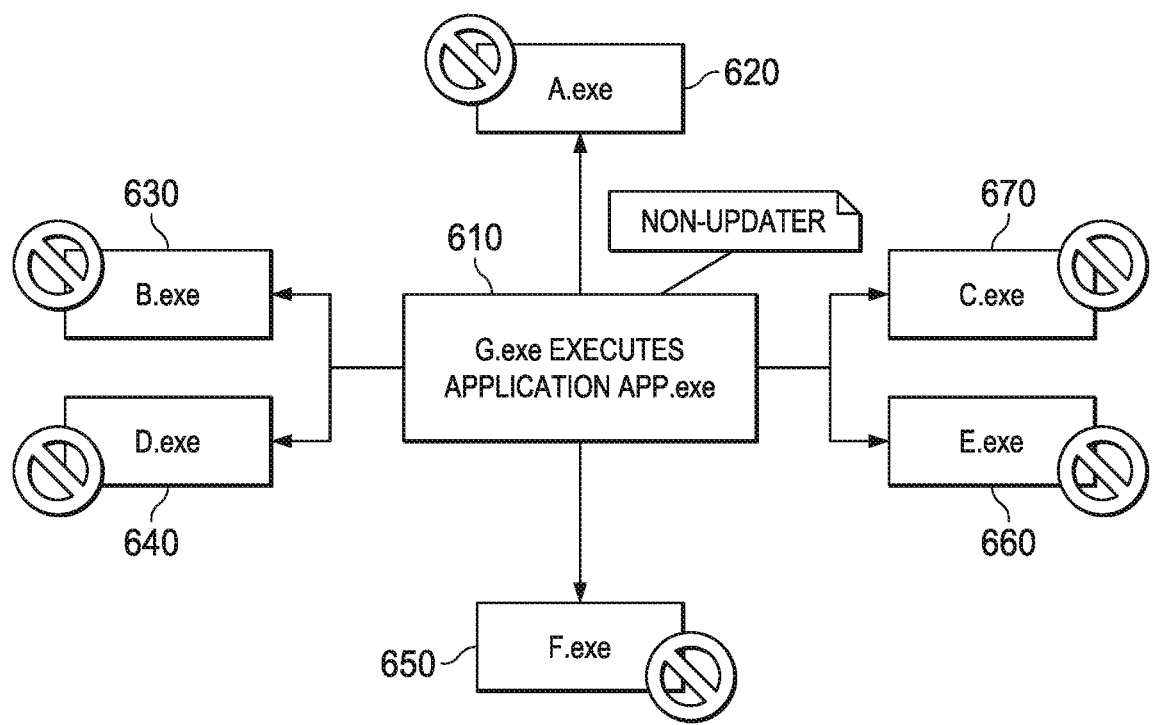
FIG. 6 is a functional block diagram of an update method according to one or more examples of the present specification.

FIG. 6 is a block diagram disclosing an example of a non-updater application G.exe 610 attempting to manipulate files in a system monitored by a system management agent 224. In this case, G.exe 610 may be a user initiated process, or in one example may be a process launched by or in association with the method of FIG. 5, such as G.exe 560 of FIG. 5.

G.exe executes an application app.exe, which itself needs to launch several executables. These include A.exe 620, B.exe 630, D.exe 640, F.exe G.exe 660, and C.exe 670. Because G.exe 610 is not marked as an updater, there is no whitelist associated with it. Thus, in this case, not only will G.exe 610 be denied write access to certain files that may need to access, but launching of the auxiliary executables may also fail.

Figure 7A:
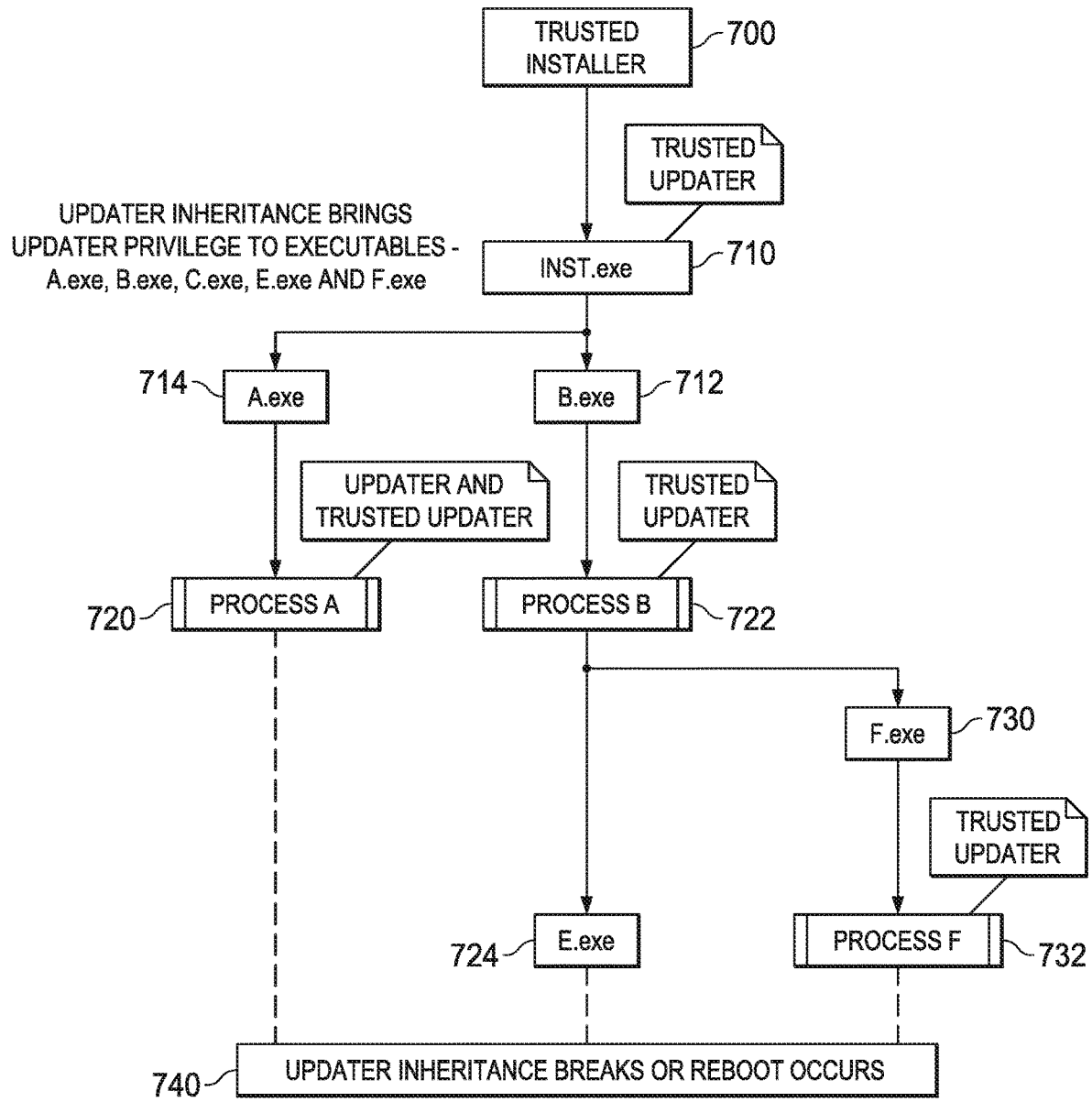
FIGS. 7A and 7B are a functional block diagram of an update method according to one or more examples of the present specification.
Figure 7B:
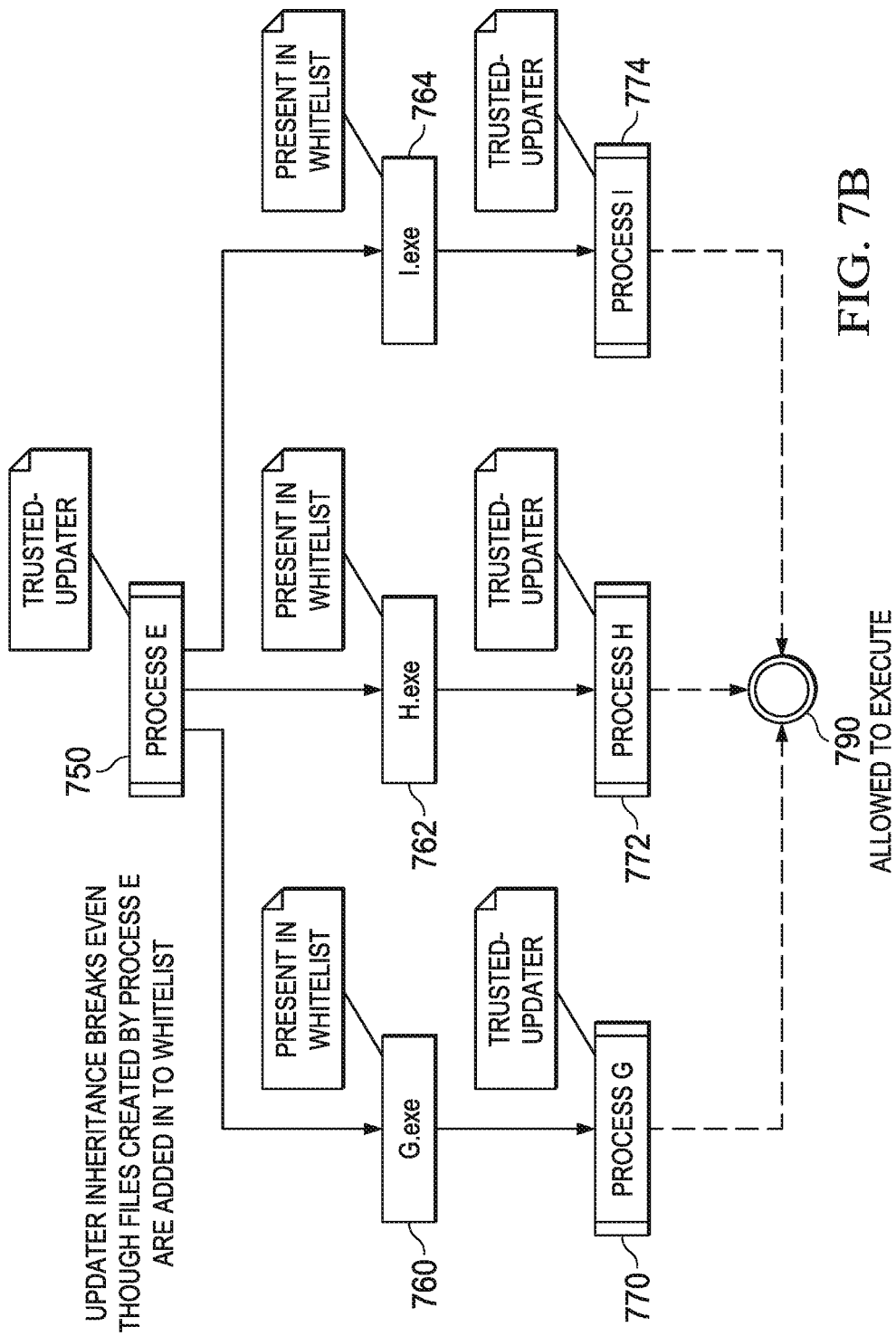

FIGS. 7A and 7B are a functional block diagram of an update method according to one or more examples of the present specification. FIG. 7A illustrates trusted installer 700. In certain embodiments, trusted installer 700 may have some or all of the properties previously described for an updater.

Trusted installer 700 may be provided by trusted updater 226 of FIG. 2. When files are added to the whitelist for trusted installer 700, system management agent 224 may keep track of files coming from trusted installer 700 and that have the same certificate. This will provide a chain of trust. These files will be allowed to modify each other. To keep track of the chain of trust, the files may each be tagged with a GUID. Thus, the files may be collectively known as the trusted updater 226.

Trusted installer 700 may be able to install applications in one of two ways: First, via third-party system management software; second via the application installer directly.

A user, such as user 120 or security administrator 150 may add trusted installer rules. A work flow for direct installation of applications by marking applications of the trusted installers may include the following:

a. Extract a certificate for the installer.
b. Any a binary object is extracted or installed by the trusted installer, the binary object is tagged with a GUID if it has an associated certificate in the trust chain. The tag is unique per trust chain, and all binaries in the chain may be treated as trusted updaters.
c. If a code file with the same certificate has been created by a trusted updater, add the file to the whitelist with the tag of the binary object that created it.
d. If a binary object attempts to modify a file whitelisted by a trusted updater, allow the modification only if the binary object and the trusted updater both have the same tag.

Thus, according to the method described herein, a trust verification matrix can be built to correlate certificates to whitelists and/or GUIDs, for the purpose of granting trusted installer or trusted updater status to certain binary objects when they execute.

A workflow for third-party system management software products designated as trusted installers may include the following:

a. Extract associated certificates of applications that are being installed via the third-party system management software.
b. Otherwise follow the same flow as described above.

Self-updates of applications may be handed by trusted updaters. There is also an option for a user to specify exclusion lists for certificates. The trusted update mechanism works only when the certificate is not in the exclusion list. This provides the user flexibility to trust a set of certificates (and in turn the entire trust chain) while using normal updater privileges for others.

This workflow is illustrated in FIGS. 7A and 7B. Trusted installer 700 launches an executable object, such as INST.exe. INST.exe 710 is marked as a trusted updater. INST.exe 710 launches binary objects A.exe 714 and B.exe 712.

A.exe 714 launches process A 720, which is marked as both an updater and trusted updater.

B.exe launches process B 722, which is also marked as a trusted updater. Process B 722 launches E.exe 724 and F.exe 730. F.exe 730 launches process F 732, which is marked as an updater and trusted updater.

As before, in block 740, an event occurs to break updater inheritance such as a reboot or an interprocess communication.

Turning to FIG. 7B, however, E.exe 724 now launches process E 750. Process E 750 is now marked as a trusted updater because its GUID can be correlated to a certificate for process E 750 in a trust verification matrix. Thus, processes 750 launches G.exe 760, H.exe 762, and I.exe 764. Each of these is present in the whitelist, and thus is allowed to act as a trusted updater.

G.exe 716 launches process G 770, which is now marked as a trusted updater. H.exe 762 launches process H 772, which is also marked as a trusted updater. I.exe 764 launches process I 774, which is marked as a trusted updater.

In block 790, process G 770, process H 772, and process I 774 are now all permitted to perform their intended functions.

Figure 8:
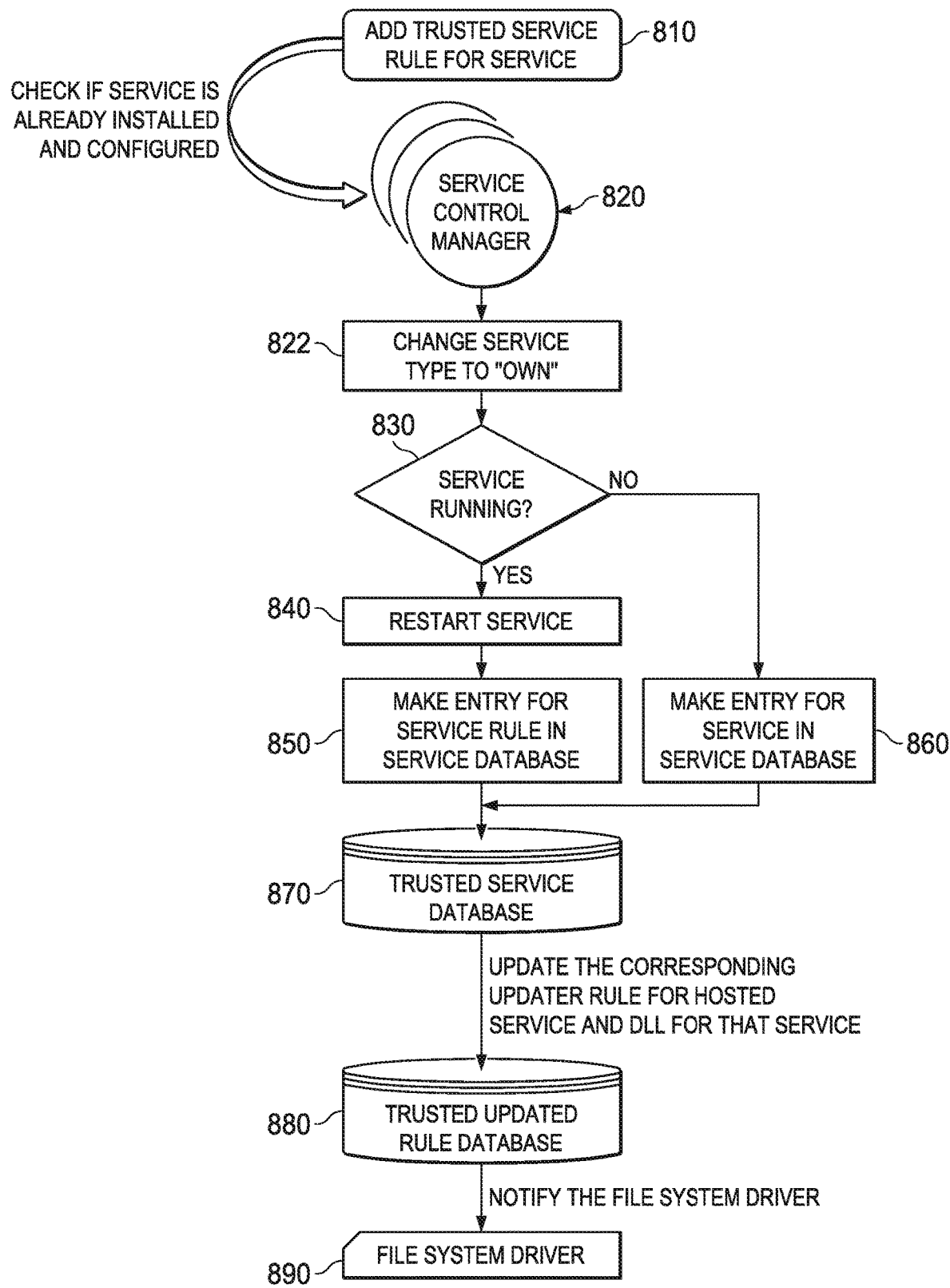
FIG. 8 is a functional block diagram of an update method according to one or more examples of the present specification.

FIG. 8 is a block diagram of a trusted service according to one or more examples of the present specification.

A trusted service includes a process container, which is a special container for hosted services wherein the services mark primarily on the basis of the certificate associated with the process container 800, or with a user made rule to mark the service as a trusted updater. By using process container 800, security administrator 150 will not have to go into the details of how a service is supposed to be loaded or what dynamic link libraries (DLLs) are associated with it. Furthermore, although the service is marked as a hosted service, a service database will be configured to be hosted in a separate instance. To ensure this feature persists across attempts to modify its configuration, registry callbacks are used to ensure th at any modification to the service database that can result in a change for service configurations are not persisted for services marked as trusted services.

Based on the configuration, a trusted service may be marked as a trusted updater only on the set of files signed by the same certificate.

An example workflow for a trusted service includes the following:
a. The user specifies a service to marked as a trusted service by name through a command line interface or other suitable user interface.
b. A trusted service framework identifies the configuration parameters such as if the services hosted, any associated binaries the implement service, and other similar parameters, and communicates those to a kernel mode framework.
c. If the service is hosted within the services marked to be hosted in its own context.
d. For the kernel mode framework keeps track of changes on Windows service controller database, which is part of the Windows system registry. If it sees any attempt to change a trusted service configuration and a service controller database, it fills the request.
e. Any attempt to read or quarry from service controller database for any attribute of a trusted service is monitored and only the expected values are returned to ensure that the services launched in its own container. This helps to avoid off-line tampering with the database. Once a service starts a hosted service and has been identified.
f. Once a service start of a hosted service has been identified, it is noted that a hosted service is starting by the kernel mode framework and then the DLLs load and any calls made by the 1st thread are tracked to ensure that the DLL is being loaded as a service. This is done because often the DLL may be implementing to interfaces. Once it is used for hosted services, and another is a management interface that can be used by any application interacting with the trusted service.

This process can be seen implemented in FIG. 8. Specifically, in block 810, system management agent 224 as a trusted service rule for the service. This may be in response to a command from security administrator 150. System management agent 224 then checks to determine if the services are installed and configured. This information is provided to security control manager 820, which may be a portion of system management agent 224.

In block 822, service control manager 820 changes the service type to "own."

In block 830, service control manager 820 checks to determine whether the service is running. If the service is not running, then in block 860, service control manager 820 makes an entry for the service and the service database.

Returning to block 830, if the service is running, then in block 840, service control manager 820 restarts the service.

In block 850, service control manager and 20 makes an entry for the service rule in the service database.

Either from block 860 are from block 850, the process arise a trusted service database 870.

Service control manager then updates the corresponding updater rule for the hosted service and DLL for that service.

In block 880, this is provided to a trusted updated rule database 880.

Service control manager 820 then notifies file system driver 890.

Figure 9:
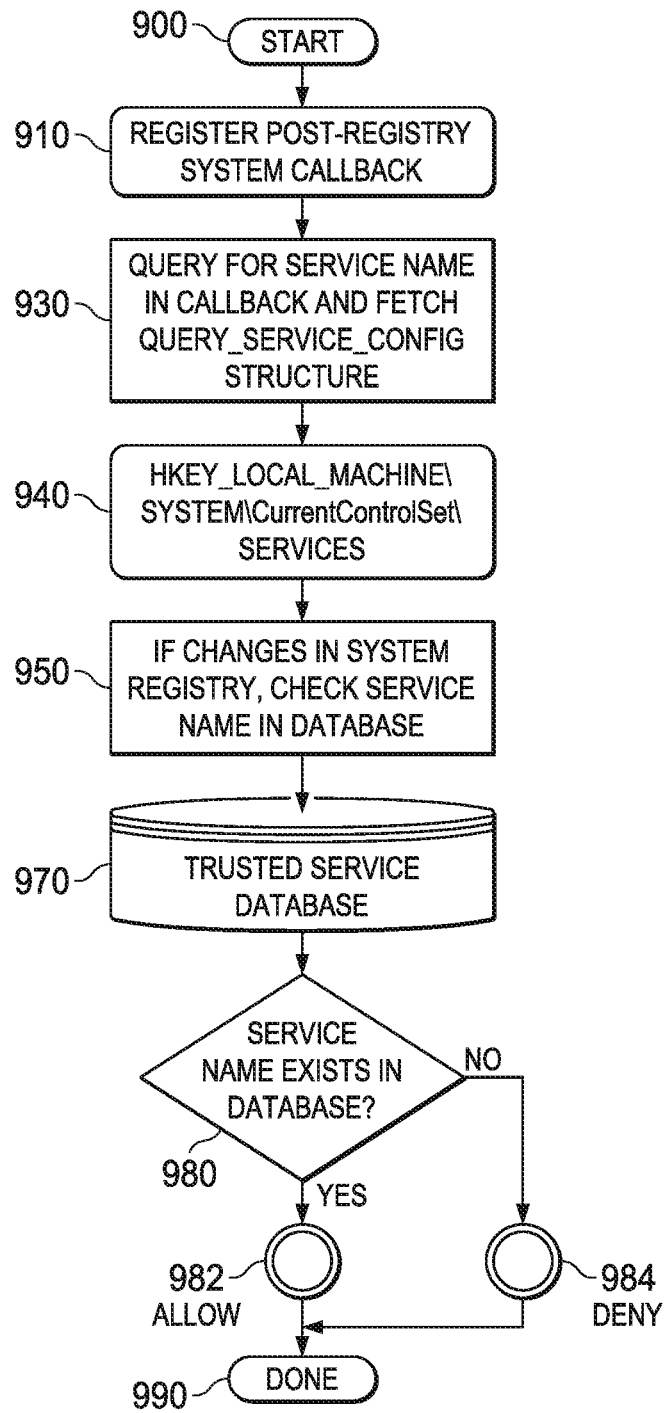
FIG. 9 is a flow chart of a method according to one or more examples of the present specification.

FIG. 9 is a block diagram of a method 900 of providing a trusted service according to one or more examples of the present specification.

In block 910, a service control manager 820 or other operative portion of system management agent 224 registers a post registry system callback.

In block 930, service management agency 24 queries for the service name in the callback and fetches the value query service config structure.

In block 940, and provides the value to a registry key.

In block 950, system management agency 24 checks to determine whether changes in the system there been changes to the system registry or and checks the service name in the database.

In block 970, the query is directed to trusted service database.

In decision block 980, system management agent 224 checks to determine whether the service name exists in the database.

In block 982, if the service chain does exist, then the process is allowed. In block 984, if the service name is not in the database, then execution is denied. In block 990, the method is done.

Figure 10:
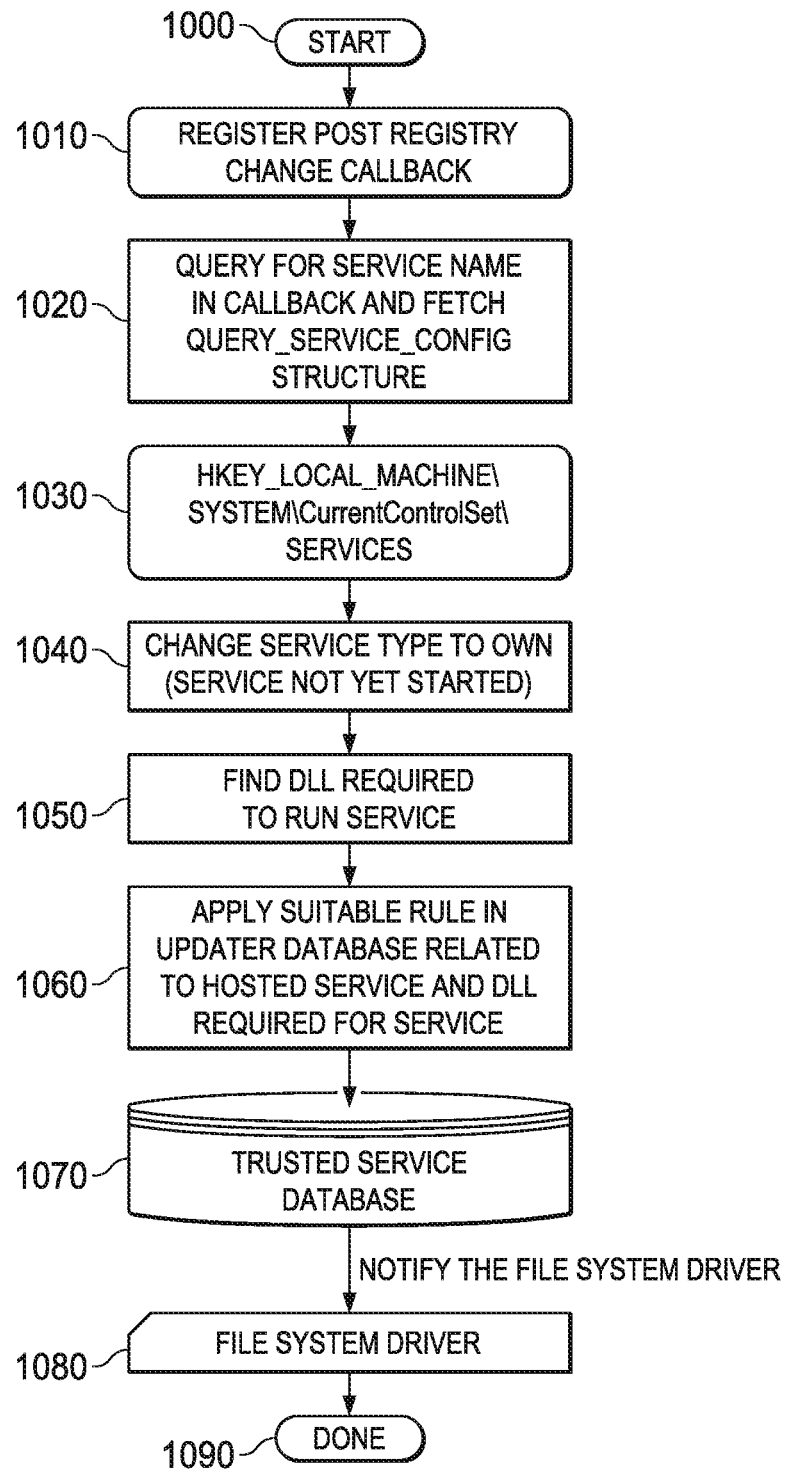
FIG. 10 is an additional flow chart of a method according to one or more examples of the present specification.

FIG. 10 is a block diagram of a method 1000, according to one or more examples of the present specification. This method is provided specifically for identifying services created by a trusted installer and Mike marking them to run as a trusted service. This involves identifying the trust chain while a service is being registered through the trusted installer framework. This is achieved by monitoring changes to the window service database through the kernel mode filtering framework in identifying binaries associated with the service being installed. If the binary associated with newly registered service is part of the trust chain than the corresponding services modified to run as a trusted service, where it has the ability to modify files that are part of its own trust chain as with any trusted updater.

Starting in block 1000, at block 1010, system management agent 324 registers post registry trend change callback.

In block 1020, system management agent's 224 carries for the service name and the callback and fetches the value query service config structure.

In block 1030, this site is received from a registry entry.

In block 1040, service management agent 224 changes the service type to "own." In this case the service is not yet started.

In block 1050, service management agent 224 finds the DLL or other library required to run the service.

In block 1060, service management agent 224 applies suitable rules and the updater database related to hosted services and the deal are required for the service.

In block 1070, changes are committed to a trust service database. In block 1080, trusted updater 226 notifies file system driver 1080. In block 1090, the method is done.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The particular embodiments of the present disclosure may readily include a system-on-chip (SOC) central processing unit (CPU) package. An SOC represents an integrated circuit (IC) that integrates components of a computer or other electronic system into a single chip. It may contain digital, analog, mixed-signal, and radio frequency functions: all of which may be provided on a single chip substrate. Other embodiments may include a multi-chip-module (MCM), with a plurality of chips located within a single electronic package and configured to interact closely with each other through the electronic package. In various other embodiments, the digital signal processing functionalities may be implemented in one or more silicon cores in application specific integrated circuits (ASICs), field programmable gate arrays (FPGAs), and other semiconductor chips.

Additionally, some of the components associated with described microprocessors may be removed, or otherwise consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, equipment options, etc.

Any suitably-configured processor component can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, an FPGA, an erasable programmable read only memory (EPROM), an electrically erasable programmable read only memory (EEPROM), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof). In operation, processors may store information in any suitable type of non-transitory storage medium (for example, in RAM, ROM, or in an FPGA, EPROM, EEPROM, etc.), software, hardware, or in any other suitable component, device, element, or object where appropriate and based on particular needs. Further, the information being tracked, sent, received, or stored in a processor could be provided in any database, register, table, cache, queue, control list, or storage structure, based on particular needs and implementations, all of which could be referenced in any suitable timeframe. Any of the memory items discussed herein should be construed as being encompassed within the broad term 'memory.'

Computer program logic implementing all or part of the functionality described herein is embodied in various forms, including, but in no way limited to, a source code form, a computer executable form, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In another example embodiment, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "steps for" are specifically used in the particular claims; and (b) does not intend, by any statement in the specification, to limit this disclosure in any way that is not otherwise reflected in the appended claims.

Example Implementations

There is disclosed in one example, a computing apparatus, comprising: a hardware platform comprising a processor and a memory; a whitelist; an updater, the updater being an executable object authorized to modify files within the whitelist and to launch one or more child processes; and instructions encoded within the memory to provide a system management agent to: maintain a chain of trust between the one or more child processes and the updater, wherein the one or more child processes inherit whitelist permissions associated with the updater; and track the chain of trust across a system reboot, comprising granting a child process the chain of trust after a reboot only if the child process has associated with it a valid certificate.

There is further disclosed an example computing apparatus, wherein the certificate is valid only if it is signed by a trusted certificate authority.

There is further disclosed an example computing apparatus, wherein maintaining the chain of trust comprises tracking files created or imported by a trusted executable and sharing a common certificate.

There is further disclosed an example computing apparatus, wherein the system management agent is further to permit files within a common chain of trust to modify one another.

There is further disclosed an example computing apparatus, wherein the whitelist is specific to the updater.

There is further disclosed an example computing apparatus, wherein the instructions are further to allocate a trusted file set, the trusted file set being a subset of the whitelist belonging to a common workflow with the updater.

There is further disclosed an example computing apparatus, wherein the updater is a system management agent.

There is further disclosed an example computing apparatus, wherein the updater is to run with elevated privileges.

There is further disclosed an example computing apparatus, wherein the updater is a kernel module.

There is further disclosed an example computing apparatus, wherein the whitelist is a system-wide whitelist.

There is further disclosed an example computing apparatus, wherein the updater is further authorized to execute any binary executable object on the computing apparatus, including binary executable objects not on the whitelist.

There is also disclosed an example of one or more tangible, non-transitory computer-readable media having stored thereon executable instructions to: associate a whitelist with an authorized updater process, the whitelist including a list of files that the authorized updater process and its descendant processes are authorized to modify; assign the updater process inheritable authority to launch child processes in a chain of trust; maintain the chain of trust when the authorized updater or a descendant of the authorized updater launches a process; and upon an invalidating event that invalidates the chain of trust, re-establish the chain of trust after establishing that a process in the chain of trust attempting to re-establish activity has a valid certificate for the chain of trust.

There is further disclosed an example of one or more tangible, non-transitory computer-readable media, wherein the invalidating event is a reboot.

There is further disclosed an example of one or more tangible, non-transitory computer-readable media, wherein the certificate is valid only if it is signed by a trusted certificate authority.

There is further disclosed an example of one or more tangible, non-transitory computer-readable media, wherein maintaining the chain of trust comprises tracking files created or imported by a trusted executable and sharing a common certificate.

There is further disclosed an example of one or more tangible, non-transitory computer-readable media, wherein the instructions are further to permit files within a common chain of trust to modify one another.

There is further disclosed an example of one or more tangible, non-transitory computer-readable media, wherein the whitelist is specific to the authorized updater.

There is further disclosed an example of one or more tangible, non-transitory computer-readable media, wherein the instructions are further to allocate a trusted file set, the trusted file set being a subset of the whitelist belonging to a common workflow with the updater.

There is further disclosed an example of one or more tangible, non-transitory computer-readable media, wherein the authorized updater is a system management agent.

There is further disclosed an example of one or more tangible, non-transitory computer-readable media, wherein the authorized updater is to run with elevated privileges.

There is further disclosed an example of one or more tangible, non-transitory computer-readable media, wherein the authorized updater is a kernel module.

There is further disclosed an example of one or more tangible, non-transitory computer-readable media, wherein the whitelist is a system-wide whitelist.

There is further disclosed an example of one or more tangible, non-transitory computer-readable media, wherein the authorized updater is further authorized to execute any binary executable object on the computing apparatus, including binary executable objects not on the whitelist.

There is also disclosed an example computer-implemented method, comprising: associating a whitelist with an updater process, wherein the updater process has inheritable permissions, including permission to modify files in the whitelist; maintaining a chain of trust for the updater process, wherein direct or indirect child processes of the updater process inherit the permissions of the updater process; detecting a reboot event that breaks the chain of trust; and re-establishing the chain of trust after determining that a process attempting to resume execution is a direct or indirect child of the updater process, and has a valid certificate.

There is further disclosed an example method, wherein the certificate is valid only if it is signed by a trusted certificate authority.

There is further disclosed an example method, wherein maintaining the chain of trust comprises tracking files created or imported by a trusted executable and sharing a common certificate.

There is further disclosed an example method, further comprising permitting files within a common chain of trust to modify one another.

There is further disclosed an example method, wherein the whitelist is specific to the authorized updater.

There is further disclosed an example method, further comprising allocating a trusted file set, the trusted file set being a subset of the whitelist belonging to a common workflow with the updater.

There is further disclosed an example method, wherein the updater is a system management agent.

There is further disclosed an example method, wherein the updater is to run with elevated privileges.

There is further disclosed an example method, wherein the updater is a kernel module.

There is further disclosed an example method, wherein the whitelist is a system-wide whitelist.

There is further disclosed an example method, wherein the updater is authorized to execute any binary executable object on the computing apparatus, including binary executable objects not on the whitelist.

There is further disclosed an example apparatus comprising means for performing the method of a number of the above examples.

There is further disclosed an example apparatus, wherein the means for performing the method comprise a processor and a memory.

There is further disclosed an example apparatus, wherein the memory comprises machine-readable instructions, that when executed cause the apparatus to perform the method of a number of the above examples.

There is further disclosed an example apparatus, wherein the apparatus is a computing system.

There is further disclosed an example of at least one computer-readable medium comprising instructions that, when executed, implement a method or realize an apparatus as claimed in a number of the above examples.

What is claimed is:

1. A computing apparatus, comprising:
    a hardware platform comprising a processor and a memory;
    a whitelist;
    an updater, the updater being an executable object authorized to modify files within the whitelist and to launch one or more child processes; and
    instructions encoded within the memory to provide a system management agent to:
        maintain a chain of trust between the one or more child processes and the updater, wherein the one or more child processes inherit whitelist permissions associated with the updater; and
        track the chain of trust across a system reboot, comprising granting a child process the chain of trust after a reboot only if the child process has associated with it a valid certificate.

2. The computing apparatus of claim 1, wherein the certificate is valid only if it is signed by a trusted certificate authority.

3. The computing apparatus of claim 1, wherein maintaining the chain of trust comprises tracking files created or imported by a trusted executable and sharing a common certificate.

4. The computing apparatus of claim 1, wherein the system management agent is further to permit files within a common chain of trust to modify one another.

5. The computing apparatus of claim 1, wherein the whitelist is specific to the updater.

6. The computing apparatus of claim 1, wherein the instructions are further to allocate a trusted file set, the trusted file set being a subset of the whitelist belonging to a common workflow with the updater.

7. The computing apparatus of claim 1, wherein the updater is a system management agent.

8. The computing apparatus of claim 1, wherein the updater is to run with elevated privileges.

9. The computing apparatus of claim 1, wherein the updater is a kernel module.

10. The computing apparatus of claim 1, wherein the whitelist is a system-wide whitelist.

11. The computing apparatus of claim 1, wherein the updater is further authorized to execute any binary executable object on the computing apparatus, including binary executable objects not on the whitelist.

12. One or more tangible, non-transitory computer-readable media having stored thereon executable instructions to:
    associate a whitelist with an authorized updater process, the whitelist including a list of files that the authorized updater process and its descendant processes are authorized to modify;
    assign the updater process inheritable authority to launch child processes in a chain of trust;
    maintain the chain of trust when the authorized updater or a descendant of the authorized updater launches a process; and
    upon an invalidating event that invalidates the chain of trust, re-establish the chain of trust after establishing that a process in the chain of trust attempting to re-establish activity has a valid certificate for the chain of trust.

13. The one or more tangible, non-transitory computer-readable media of claim 12, wherein the invalidating event is a reboot.

14. The one or more tangible, non-transitory computer-readable media of claim 12, wherein the certificate is valid only if it is signed by a trusted certificate authority.

15. The one or more tangible, non-transitory computer-readable media of claim 12, wherein maintaining the chain of trust comprises tracking files created or imported by a trusted executable and sharing a common certificate.

16. The one or more tangible, non-transitory computer-readable media of claim 12, wherein the instructions are further to permit files within a common chain of trust to modify one another.

17. The one or more tangible, non-transitory computer-readable media of claim 12, wherein the whitelist is specific to the authorized updater.

18. The one or more tangible, non-transitory computer-readable media of claim 12, wherein the instructions are further to allocate a trusted file set, the trusted file set being a subset of the whitelist belonging to a common workflow with the updater.

19. A computer-implemented method, comprising:
    associating a whitelist with an updater process, wherein the updater process has inheritable permissions, including permission to modify files in the whitelist;
    maintaining a chain of trust for the updater process, wherein direct or indirect child processes of the updater process inherit the permissions of the updater process;
    detecting a reboot event that breaks the chain of trust; and
    re-establishing the chain of trust after determining that a process attempting to resume execution is a direct or indirect child of the updater process, and has a valid certificate.

20. The method of claim 19, wherein the certificate is valid only if it is signed by a trusted certificate authority.

* * * * *

UNITED STATES PATENT AND TRADEMARK OFFICE
CERTIFICATE OF CORRECTION

| | | |
|---|---|---|
| PATENT NO. | : 10,929,540 B2 | Page 1 of 1 |
| APPLICATION NO. | : 16/565643 | |
| DATED | : February 23, 2021 | |
| INVENTOR(S) | : Preet Mohinder et al. | |

It is certified that error appears in the above-identified patent and that said Letters Patent is hereby corrected as shown below:

On the Title Page

Item "(71) Applicant:", Line 1, delete "Inc.," and insert -- LLC,. --, therefor.

Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office*